United States Patent

Romanzi et al.

[11] 3,990,651
[45] Nov. 9, 1976

[54] SAFETY BELT RETRACTOR LOCKING DEVICE

[75] Inventors: Louis Romanzi, Milford; David S. Robinson, Jackson, both of Mich.

[73] Assignee: Irvin Industries, Inc., Greenwich, Conn.

[22] Filed: Nov. 18, 1974

[21] Appl. No.: 524,815

[52] U.S. Cl. .................................. 242/107.4 A
[51] Int. Cl.² .................... A62B 35/00; B65H 75/48
[58] Field of Search ............. 242/107.4 R, 107.4 A; 297/388; 188/135, 136, 139; 280/744–747

[56] References Cited
UNITED STATES PATENTS

| | | | |
|---|---|---|---|
| 3,722,824 | 3/1973 | Hayashi | 242/107.4 A |
| 3,834,646 | 9/1974 | Heath | 242/107.4 X |
| 3,868,068 | 2/1975 | Heath | 242/107.4 |
| 3,901,459 | 8/1975 | Romanzi et al. | 242/107.4 A |

*Primary Examiner*—Stanley N. Gilreath
*Assistant Examiner*—John M. Jillions
*Attorney, Agent, or Firm*—McAulay, Fields, Fisher & Goldstein

[57] ABSTRACT

A vehicle acceleration sensitive locking device is disclosed for use with a conventional safety belt retractor having a shaft mounted ratchet. The locking device includes a pivotally mounted pawl normally spaced from the ratchet by a preselected distance and an inertial mass pivotally mounted to sense change in vehicle velocity above a level predetermined to be dangerous. Movement of the inertial mass displaces the pawl to its operate position to block rotation of the ratchet and the safety belt retractor shaft and, thereby, prevent protraction of the safety belt when the change in vehicle velocity exceeds the predetermined level. The device further includes adjustment means operative to limit movement of the pawl away from the ratchet when the pawl is in its inoperative position to determine the normal spacing between said pawl and ratchet.

6 Claims, 3 Drawing Figures

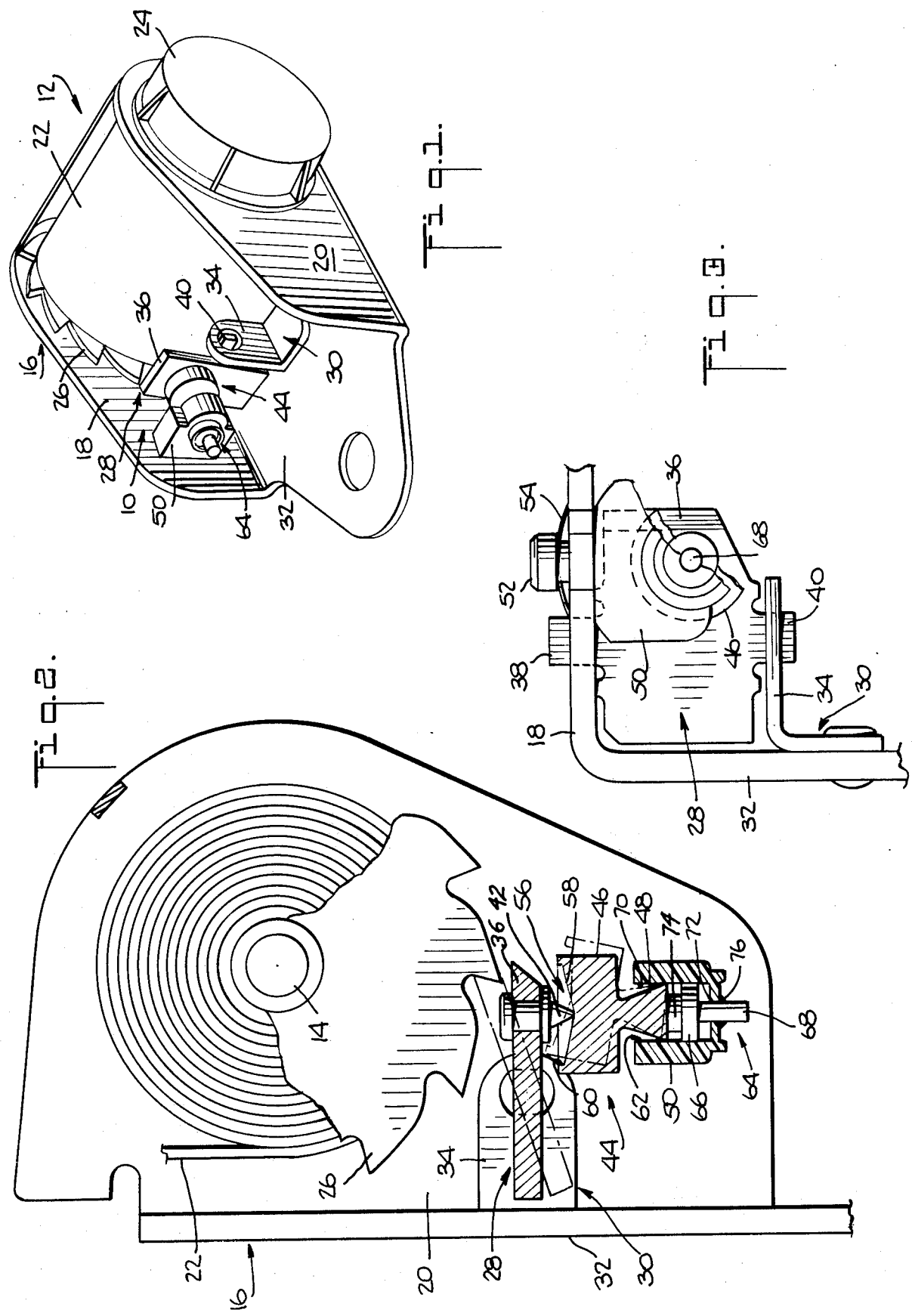

SAFETY BELT RETRACTOR LOCKING DEVICE

BACKGROUND OF THE INVENTION

1. Field of the Invention

This invention relates generally to safety belt retractors having a locking device for preventing protraction of a safety belt when the vehicle is undergoing a velocity change in excess of a predetermined magnitude.

2. Description of the Prior Art

Most vehicles, especially automobiles, are equipped with safety belts in order to restrain a passenger in his seat when the vehicle is undergoing a substantial change in velocity, such as when the vehicle is involved in an accident. In order for the safety belt to be effective, the belt must be locked into position to prevent protraction of the belt during the vehicle velocity change. For example, if an automobile decelerates rapidly because of an impact, the passenger will be thrown forwardly due to inertia and will apply considerable force against the safety belt. Therefore, in order for the belt to be effective, it must be locked in position to prevent movement of the belt during this deceleration.

It is to be understood that where the term "change in velocity" is used throughout the application, the term shall be interpreted to mean change in velocity in a relatively short interval of time as would be encountered, for example, in a crash situation or a sudden emergency stop.

Present day retractors such as disclosed in U.S. Pat. No. 3,838,832 owned by the assignee herein, permit continual protraction and/or retraction of the belt after it is positioned around the passenger and during the entire period that the vehicle undergoes changes in the velocity less than a predetermined dangerous amount. The passenger is thus afforded freedom of movement without having to unbuckle the belt and completely retract the same. However, when the vehicle undergoes a velocity change in excess of the said predetermined amount, the locking device is rendered operative to prevent further protraction of the belt and restrain the passenger in his seat.

More specifically, the retractor disclosed in the aforesaid patent permits protraction of the belt while the passenger places the belt around himself, and upon release of the belt, the retractor draws the belt snugly against the passenger. Retractors of this type have a shaft rotatably mounted on a frame and around which the safety belt is wrapped for protraction and retraction with respect thereto. A bias spring urges the shaft to rotate in a direction to wrap the safety belt around the shaft. The retractor also includes a ratchet drivingly connected to the shaft and operatively associated with a locking device to prevent protraction of the safety belt at certain predetermined times.

The known locking devices may be of the type comprising a pendulous mass which is responsive to a change in vehicle velocity, including any change in vehicle direction. The pendulous mass is mounted so that it is moveable between a first position wherein the change in vehicle velocity is below a predetermined magnitude, and a second position wherein the change in vehicle velocity is greater than said predetermined magnitude to effect operation of the locking device.

The known structure further provides for a pivotally mounted pawl which is capable of movement from an inoperable position wherein said pawl is spaced from the ratchet by a preselected distance to an operation position wherein said pawl engages the ratchet to prevent protraction of the belt. The pawl is also operatively associated with the mass such that movement of the pawl is responsive to the position of the mass. The arrangement is such that when the mass is in its second position, the pawl is displaced to its operate ratchet engaging position to prevent protraction of the belt.

Since the safety belt retractor locking device is intended for use on vehicles of different manufacturers, each having different specifications on the magnitude of the change in velocity considered dangerous to effect operation of the locking device, it was heretofore extremely difficult, if not impossible, to design a generally universal type locking device suitable to satisfy the needs and requirements of all the manufacturers. For example, the spacing between the pawl and the ratchet, when the pawl is in its inoperative position, is preselected in accordance with the customer's specification to obtain the desired level of sensitivity of the locking mechanism. In this regard, the said spacing may vary between 0.018 inches (0.046 cm.) and 0.042 inches (0.107 cm.) depending upon the desired level of sensitivity.

It will be appreciated that since movement of the pawl is a function of the pivotal movement of the mass, then the extent to which the mass pivots in displacing the pawl to its operative ratchet engaging position is a function of the preselected spacing between the pawl and the ratchet. Accordingly, once the spacing between the pawl and the ratchet is determined from the customer's specifications, the position of the mass is similarly readily determined for that specific application of use. The spacing between the pawl and the ratchet is very crucial, and precise measuring equipment is necessary to insure that the component parts of the locking device are manufactured within acceptable tolerances.

In those instances where the mass is pivotally supported within an opening or well of the frame structure, the dimensional limitations of the well are fixed in order to locate the mass in the determined position. It will thus be appreciated that the fixed dimensions of the well, or other supporting structure for the mass, will be different for each specific application of use as determined from the position of the mass required to satisfy the customer's specifications. Accordingly, it was usually necessary to design a separate locking mechanism having specific tolerances for each application of use. The present invention substantially reduces the number of separate locking mechanisms required to satisfy the varied requirements of all automobile manufacturers. In this regard, it is within the purview of the invention to provide a single locking mechanism operable within a range of levels of sensitivity to satisfy the specific requirements of most of the automobile manufacturers.

SUMMARY OF THE INVENTION

The present invention is directed to a novel retractor locking device intended for use with a conventional safety belt retractor of the type heretofore described. More specifically, the device comprises a belt attached to a shaft rotatably mounted on the frame of the device for protraction and retraction. A ratchet wheel is also mounted on the shaft for rotation therewith.

A pawl is mounted on the frame normally spaced from the ratchet by a preselected distance and moveable into engagement with said ratchet to present protraction of the belt. An inertial mass is also mounted on the frame in engagement with the pawl wherein the mass is disposed for movement responsive to changes in velocity for moving the pawl into a ratchet engaging position.

An adjustable support member is provided for supporting the mass on the frame. In this regard, the frame is formed having interior wall surfaces defining a well or opening for receiving the support member. The arrangement is such that adjustment of the support member within the well serves to selectively position the mass and determine the normal spacing between the pawl and the ratchet for a given application of use. The position of the mass may thus be adjusted to limit the extent to which the pawl moves away from the ratchet by the preselected distance as determined from the customer's specifications to obtain the desired level of sensitivity. After the position of the mass is determined, the support member is then fixed in its position within the well to insure that the spatial relationships of the ratchet, pawl and mass, with respect to each other, do not vary for a given application of use.

In another aspect of the invention, the interengaging relation of the pawl with the mass is such that after the mass has moved to a position representing a change in vehicle velocity greater than the predetermined dangerous amount, the pawl serves to also limit further pivotal movement of the mass beyond said position.

Accordingly, an object of the present invention is to provide a safety belt retractor locking device having an adjustable member for rendering the locking meachanism operable at a specific level of sensitivity selected within a range of levels of sensitivity.

Another object and feature of the present invention is to provide a safety belt retractor locking device having an adjustable support member for positioning the mass on the frame and determining the normal spacing between the pawl and the ratchet.

A further object, feature and advantage of the present invention is to provide a safety belt retractor locking device which is inexpensive to manufacture; does not require the services of a highly skilled mechanic to assemble and install; and which is repeatedly reliable in operation.

The above and other objects, features and advantages of the present invention will become more apparent from a full consideration of the following detailed description when taken in conjunction with the accompanying drawings.

BRIEF DESCRIPTION OF THE DRAWINGS

FIG. 1 is a perspective view of the safety belt retractor locking device constructed in accordance with the present invention, the locking device cover having been removed to illustrate the operative elements thereof;

FIG. 2 is an end elevational view, partly in section and with parts broken away, and with other parts removed for the purpose of clarity, of the locking device of FIG. 1, illustrating in solid line the position of the operative elements prior to the vehicle undergoing a velocity change in excess of a predetermined dangerous amount, and illustrating in phantom line the position of said elements after the vehicle has undergone a velocity change in excess of said predetermined dangerous amount; and FIG. 3 is a bottom view, with parts broken away, of the locking device of FIG. 2.

DESCRIPTION OF THE PREFERRED EMBODIMENT

Referring to the drawings, particularly FIGS. 1 and 2, numeral 10 represents a safety belt retractor locking device constructed in accordance with the present invention. Locking device 10 is intended to be used in combination with a conventional safety belt retractor 12 of the type illustrated in the drawings. It should be noted, however, that the retractor illustrated represents only one type of retractor mechanism suitable for use with the present locking device and is not to be deemed a limitation on the present invention or to the scope of patent coverage claimed herein.

To simplify an understanding of this invention there now follows a description of a typical conventional safety belt retractor. Retractor 12 includes a shaft 14 rotatably mounted within a frame 16 formed with spaced apart side walls 18, 20 each having an aperture therein for receiving a respective end of the shaft 14. The side walls thus serve as a support for the shaft. One end of a safety belt 22 is fixedly connected to the shaft 14 and is wrapped around the shaft so as to be disposed for protraction and retraction with respect thereto.

The end of the shaft 14 that extends through the aperture in the frame wall 20 is rotatably associated with the inner end of a helical flat spring (not shown). The outer end of the spring is attached to or bears against a spring closure 24 which encloses and confines the spring. The spring exerts a force on shaft 14 in the direction of belt retraction. A ratchet 26 is mounted on the shaft 14 on the inside of side wall 18 and is disposed for rotation together with the shaft.

A passenger seated in the vehicle seat and desiring to buckle the safety belt around himself protracts the safety belt 22 by pulling one end thereof until it is long enough to enable him to engage that end of the safety belt with a second half of the safety belt (not shown) in a conventional manner. During protraction of the safety belt 22 the flat coil spring is wound tightly thereby applying a greater force on the shaft 14 tending to retract the safety belt. Upon release of the safety belt 22 by the passenger, the spring retracts the belt until the belt 22 fits snugly around the passenger. If the passenger wants to extend the belt 22 further, he will be able to do so by merely applying a force on the belt. However, during emergency situations, there is nothing provided with the retractor 12 to prevent the belt from being protracted. That is the purpose for the locking device 10 of the present invention.

Locking device 10 comprises a pawl 28 pivotally mounted on the frame 16. In this regard, an L-shaped bracket 30 is mounted on the back wall 32 of frame 16 having an outwardly projecting arm 34 formed with an opening therein. Bracket 30 is located with arm 34 spaced from the inside of side wall 18 and parallel thereto. Side wall 18 also is formed with an opening located in alignment with the opening in bracket arm 34. Referring to FIGS. 1 and 3, the pawl 28 includes a primary portion 36 and a pair of opposed, outwardly projecting fingers or tabs 38, 40. Pawl 28 is positioned between side wall 18 and bracket arm 34 with each of said fingers 38, 40 being received within the respective opening in said wall and arm. The side wall 18 and bracket arm 34 thus serve to pivotally support pawl 28 for movement from an inoperable position wherein the pawl primary portion 36 is spaced from ratchet 26 permitting free rotation of said ratchet to an operate position wherein the pawl primary portion 36 engages ratchet 26 preventing said ratchet from rotating in a direction of protraction of safety belt 22.

Alternatively, in place of bracket 30, it will be appreciated that the frame back wall 32 can be formed with an outwardly projecting stamped-out portion having an opening therein for supporting one of the pawl fingers 38, 40 in a manner similar to that described in connection with bracket arm 34.

The primary portion 36 of pawl 28 is formed having an opening through which is mounted a contact element 42 disposed for engagement with the control member of the locking device in a manner hereinafter described.

The central control for locking device 10 is a member 44 responsive to acceleration. A pivotal mass 44 having an enlarged head 46 and a depending post portion 48 seats within the well 62 of a bracket 50 that is mounted on a frame side wall 18. Bracket 50 has an outwardly projecting slotted stud 52 held within an opening in frame side wall 18, and retained in position by lock washer 54.

The top surface of the head 46 has a generally circular recess 56 and a camming surface 58 which tapers radially outwardly and upwardly from the center thereof. The surface 58 terminates in a shoulder 60 that engages the pawl contact element 42 to limit pivotal movement of the mass 44. The wall of the post 48 tapers inwardly from its base end toward the head 46. Bracket 50 has an opening through which the tapered post 48 projects. The pivotal mass 44 is free to pivot in any direction away from a vertical axis.

The mass 44 rests on its base so that the mass 44 can pivot about various points along the edge of its base. The safety belt retractor is so mounted in the vehicle that, when the vehicle is in its normal horizontal position, the pivotal mass 44 is seated with its main axis vertical. As the mass 44 is subjected to acceleration (a change in vehicular velocity in any direction) the mass 44 will pivot about a point on its base.

Below a certain magnitude of velocity change (that is, below a certain absolute acceleration), there is little or no likelihood of danger to the passenger in the vehicle. Thus, below a predetermined absolute acceleration, it is desirable to avoid having the seat belt lock up. It is below that magnitude of absolute acceleration that one seeks to permit the seat belt user to have the comfort of having the seat belt readily protract as the rider shifts position.

The design parameters are selected to avoid locking-up the seat belt at an absolute acceleration less than a predetermined magnitude. These design parameters are (a) the amount by which the contact element 42 rides up the surface 58 when the mass 44 tilts in response to absolute acceleration of the predetermined magnitude and (b) the spacing between pawl 28 and ratchet 26. The angle at which the mass 44 tilts in response to the predetermined acceleration is, in turn, a fraction of mass magnitude and distance between mass center of gravity and the base of the mass 44.

The number of degrees that the mass 44 pivots away from vertical in response to this predetermined acceleration may be in the order of magnitude of 15°. The locking device 10 is designed so that the displacement of the pawl 28 in riding up the surface 58 when the mass 44 tilts 15° does not cause engagement of the pawl 28 and the ratchet 26.

However, a change in vehicle velocity greater than the predetermined magnitude, causes the mass 44 to tilt or pivot more than this 15° angle and thereby causes the pawl 36 to ride further up the cam surfce 58 of the mass 44 with the result that the pawl 28 and ratchet 26 engage thereby locking the safety belt against further protraction in the manner hereinafter described. Accordingly, the pivotal mass 44 responds to a range of absolute accelerations including those less than the minimum at which it is desired to lock up the safety belt.

Each vehicle manufacturer has its own specification on the change in velocity considered dangerous to effect operation of locking device 10. Accordingly, to provide a single locking mechanism operable within a range of levels of sensitivity to satisfy the requirements of most vehicle manufactures, adjustment means are provided during assembly of locking device 10 to render the device operable at a desired level of sensitivity in accordance with the specific reqeuirements of any one particular customer.

The device locks when pawl 28 engages ratchet 26. Pawl contact element 42 rides on cam surface 58 as the mass 44 tilts in response to acceleration. Pawl 28 is thus displaced as a function of mass 44 tilt. Once the spacing between the pawl 28 and the ratchet 26 is determined from the customer's specifications to obtain the desired sensitivity of the locking mechanism, the vertical position of the mass 44 is determined for that specific application. The adjustment means herein enables the mass 44 to be positioned in accordance with the desired level of sensitivity of the device.

The adjustment means comprises an adjustable support member represented generally by the numeral 64 for supporting the mass 44 on frame 16 in the desired position. Support member 64 comrises a substantially T-shaped pin having a head portion 66 and a post portion 68 depending downwardly from the head portion. Support member 64 is held within bracket opening or well 62 at a position which determines the extent to which the post portion 48 of mass 44 extends into the bracket opening 62.

Referring to FIG. 2, bracket opening 62 is defined by interior wall surfaces 70 and a bottom surface 72 having an opening through which projects the support post portion 68. Projecting upwardly from the support head portion 66 is a crown 74 disposed to engage with the post portion 48 of mass 44 in the manner hereinafter described. The support head portion 66 is formed having a dimension substantially coextensive with a corresponding dimension between opposed wall surfaces 70 of bracket opening 62 to permit support member 64 to be slideably positioned within bracket 50. This dimension is substantially greater than the corresponding dimension of crown 74. In other words, the outer surfaces of crown 74 are spaced from the interior wall surfaces 70 of bracket opening 62 to permit pivotal movement of mass 44 as will become apparent in the description of the operation of the device.

It is to be noted that support member 64 is defined as being adjustable in the sense that the adjustment is made during assembly of locking device 10 to meet the customer's specifications. Thereafter, in order to insure that the device is repeatedly reliable in operation, it is necessary to provide that support member 64 does not move or shift from its adjusted position. This is attained by manufacturing bracket 50 and support member 64 of thermoplastic material whereupon, after adjustment of support member 64 to its desired position, heat is applied to support post portion 68 in the region adjacent the outer bottom surface 72 of bracket 50. Support post portion 68 thus becomes sealed or fused to bracket 50, as represented by numeral 76, to prevent any further movement of support member 64 from its adjusted position.

In assembly, support member 64 is inserted within bracket opening 62 and mass 44 is thereafter inserted within said bracket opening so as to locate the post portion 48 of the mass in engagement with the crown 74 of support member 64. The spacing between the pawl primary portion 36 and the ratchet 26, when the pawl is in its inoperable position, is then preselected in accordance with the customer's specification to obtain the desired level of sensitivity of the locking mechanism. This spacing may vary between 0.018 inches (0.046 cm.) and 0.042 inches (0.107 cm.). Once the required spacing between the pawl and ratchet is determined, the support post portion 68 is pushed upwardly to position the inertial mass 44 in contact relation with pawl 28. In this regard, mass 44 is adjustably positioned with the pawl contact element 42 slideably engaging the bottom wall 58 in recess 56 of the mass. Heat is then applied to support portion 68 in the manner heretofore described to seal support member 64 in the required position.

It will now be appreciated that adjustment of support member 64 is effective to position the mass 44 on frame 16 and determine the normal spacing between the pawl 28 and the ratchet 26. It will further be appreciated that adjustment of support member 64 within bracket 50 is effective to limit the extent to which the mass 44 is received within bracket opening or well 62 and selectively position the mass spaced from the base of said well. The arrangement is such that support member 64 also serves to limit movement of the pawl 28 away from the ratchet 26 by the preselected spacing or distance when the pawl is in its inoperable position.

The solid line illustration in FIG. 2 represents the position of the operative elements prior to the vehicle undergoing a velocity change in excess of the predetermined dangerous amount. Pawl 28 is spaced from ratchet 26 by a predetermined distance in accordance with a particular customer's specification, which distance represents the inoperable position of the pawl, and mass 44 is illustrated in its heretofore designated first position. Safety belt 22 may now be freely protracted and/or retracted during the entire period that the vehicle undergoes changes in velocity less than the predetermined amount whereby the passenger is thus afforded freedom of movement without having to unbuckle the belt and completely retract the same.

As such time when the vehicle velocity has changed by an amount greater than the predetermined dangerous amount, the elements of locking device 10 assume the positions illustrated by the phantom lines of FIG. 2. For example, if the vehicle is involved in a collision while moving forwardly, the vehicle will decelerate causing inertial mass 44 to pivot to its heretofore designated second position. Such movement serves to pivot pawl 28 counterclockwise which, in turn, displaces pawl primary portion 36 into the path of movement of ratchet 26. The passenger, whose body is thrown against the safety belt 22, causes a slight protraction of the belt which causes shaft 14 to rotate clockwise as viewed in FIG. 2. Such rotation similarly effects clockwise rotation of ratchet 26 which serves to engage pawl primary portion 36 with one of the teeth of ratchet 26 to prevent further protraction of safety belt 22 to thereby restrain the passenger in his seat.

Upon completion of the rapid velocity change, such as when the vehicle is brought to a sudden stop and the passenger relaxes in his seat, the safety belt is then retracted under influence of the retractor spring to fit snugly around the passenger. Inertial mass 44 also pivots back to its heretofore designated first position which permits pawl 28 to pivot clockwise, under influence of gravity, to its inoperable position. The elements are now reset to the respective positions illustrated by the solid lines in FIG. 2.

Referring to the phantom line illustration of FIG. 2, it is noted that contact element 42 slideably engages the bottom recess wall 58 of inertial mass 44 and rides along said wall until it bears against shoulder 60 to prevent the mass from pivoting beyond its heretofore designated second position. The structure is such that the outer wall surfaces of mass post portion 48 are spaced from the inner wall surfaces 70 of bracket opening 62 during operation of the device to avoid any unnecessary restraint on pivotal movement of inertial mass 44, and wherein the interengagement of contact element 42 with shoulder 60 also functions to prevent the outer wall of post 48 from contacting the inner wall of bracket opening 62.

From the foregoing, it can be seen that the safety belt retractor locking device of this invention provides the convenience of permitting continual protraction and retraction during the entire period when the vehicle is not undergoing a velocity change in excess of a predetermined dangerous amount, and yet effectively prevents protraction of the belt during a velocity change in excess of the predetermined amount. The device can be manufactured and installed inexpensively without requiring the services of a highly skilled mechanic, and is adapted to be used with conventional retractor mechanisms.

The manufacturing problems heretofore associated with the critical tolerances of the component parts of the locking device are substantially simplified since the height of the mass post portion 48 and the depth of the bracket well as no longer deemed critical. In this regard, slight variances in these dimensions may be readily compensated by selective adjustment of support member 64 within bracket 50 to accurately position mass 44 and maintain the desired spacing between the pawl 28 and the ratchet 26. The device is reliable in operation and is repeatedly reliable for prolonged use.

At such time as a customer requests, a different locking mechanism operable at another level of sensitivity, which merely requires a different spacing between the pawl 28 and the ratchet 26, it is only necessary to locate support member 64 at a readjusted position during assembly of the new mechanism. This readjustment serves to reposition the mass to effect the predetermined different spacing between the pawl and the ratchet, and thus provide a locking mechanism operable at the requested level of sensitivity. It will be appreciated that the so called "different" locking mechanism is only different in the sense of the adjusted spatial relationships of the various elements, and that no additional or new components have to be included in the aforesaid structure. Thus, a single locking mechanism is provided which may be rendered operable within a range of levels of sensitivity to satisfy the requirements of most customers.

While a preferred embodiment of the invention has been shown and described in detail, it will be readily understood and appreciated that numerous omissions, changes and additions may be made without departing from the spirit and scope of the present invention. Thus, for example, it is within the purview of the present invention to alter the taper for post portion 48 relative to bracket opening 62, whereby said post portion may be formed having a cylindrical shape and the interior wall surfaces 70 of frame opening 62 would then taper upwardly and in diverging relation toward the open end thereof. The cooperative result or effect is the same since inertial mass 44 is still capable of pivoting to its second position in which the outer wall surfaces of post portion 48 are prevented from contacting the inner wall surfaces 70 of frame opening 62 by means of the interengagement of contact element 42 with the mass shoulder portion 60. Furthermore, the shape of enlarged mass portion 46 is not limited to the generally cylindrical shape illustrated in the drawings, and may be constructed having tapered walls similar to that provided for post portion 48.

We claim:
1. A safety belt retractor locking device comprising:
   a. a frame having interior wall surfaces and a bottom surface defining a well, the bottom surface of said well having an opening therein;
   b. a shaft rotatably mounted on the frame;
   c. a belt attached to the shaft for protraction and retraction with respect thereto;
   d. means for rotating the shaft to retract the belt;
   e. a ratchet wheel mounted on the shaft for rotation therewith;
   f. a pawl pivotally mounted on the frame for movement from an inoperable position wherein said pawl is spaced from the ratchet by a preselected distance to an operate position wherein said pawl engages the ratchet to prevent protraction of the belt;
   g. an inertial mass pivotally mounted on the frame and responsive to a change in vehicle velocity, said mass disposed for movement between a first position wherein the velocity change is below a predetermined magnitude and a second position wherein the velocity change is greater than said predetermined magnitude;
   h. said mass having a head portion and a post portion depending downwardly from the head portion, said post portion having an outer wall surface received within the well of said frame, at least one of the interior wall surfaces of said well and the outer wall surface of said post portion being tapered to permit said mass to pivot relative to said frame;
   i. said pawl engageable with said mass for movement of the pawl to a position responsive to the position of the mass, whereby the pawl is displaced to its operate position when the mass is in its second position; and
   j. a separate support member mounted within the well of said frame, said support member comprising a pin having a head portion and a post portion depending downwardly from the head portion, said post portion having an end projecting through the opening in the bottom surface of said well and said head portion engagable with the post portion of said mass, whereby said support member is positioned for limiting the extent to which the post portion of the mass is received within said well, and thereby limiting movement of said pawl away from the ratchet by said preselected distance when the pawl is in its inoperable position.

2. The safety belt retractor locking device as recited in claim 1, wherein the head portion of said pin has an upwardly projecting crown engagable with the post portion of said mass.

3. The safety belt retractor locking device as recited in claim 2, in which the head portion of said pin has a dimension substantially coextensive with a corresponding dimension between opposed wall surfaces of the well of said frame and greater than the corresponding dimension of said crown.

4. The safety belt retractor locking device as recited in claim 1, wherein the interior walls of the well of said frame define a substantially cylindrical surface and the outer wall of the post portion of said mass define a substantially conical surface having it greatest diameter at the bottom of said post portion and its smallest diameter adjacent the head portion of said mass.

5. The improved safety belt retractor locking device as recited in claim 1, wherein the head portion of said mass is formed having a generally circular recess including a bottom wall tapering radially outwardly and upwardly from the center thereof and side walls defining a shoulder; said pawl including a contact element having a rounded surface slideably engaging the bottom wall of said recess; said pawl contact element engaging the shoulder of said recess upon movement of said mass to its second position to limit further pivotal movement of said mass and prevent the outer wall surfaces of the post portion from contacting the interior wall surfaces of the well of said frame.

6. The safety belt retractor locking device as recited in claim 1, wherein the post portion of said pin is sealed to the bottom surface of the well of said frame.

* * * * *